(12) United States Patent
Zhang et al.

(10) Patent No.: US 11,126,199 B2
(45) Date of Patent: Sep. 21, 2021

(54) LEARNING BASED SPEED PLANNER FOR AUTONOMOUS DRIVING VEHICLES

(71) Applicant: Baidu USA LLC, Sunnyvale, CA (US)

(72) Inventors: Liangliang Zhang, San Jose, CA (US);
Dong Li, Sunnyvale, CA (US);
Jiangtao Hu, Sunnyvale, CA (US);
Jiaming Tao, Sunnyvale, CA (US);
Yifei Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 253 days.

(21) Appl. No.: 15/954,366

(22) Filed: Apr. 16, 2018

(65) Prior Publication Data
US 2019/0317520 A1    Oct. 17, 2019

(51) Int. Cl.
*G05D 1/02*      (2020.01)
*G05D 1/00*      (2006.01)
*B60W 50/00*   (2006.01)

(52) U.S. Cl.
CPC ....... *G05D 1/0274* (2013.01); *B60W 50/0098* (2013.01); *G05D 1/0088* (2013.01);
(Continued)

(58) Field of Classification Search
CPC .. G05D 1/0274; G05D 1/0088; G05D 1/0221; G05D 1/0223; G05D 1/0214;
(Continued)

(56) References Cited

U.S. PATENT DOCUMENTS 4,727,365 A * 2/1988 Bunker ................ G06T 15/80
345/427
5,170,441 A * 12/1992 Mimura ................ H04N 9/28
348/409.1
(Continued)

FOREIGN PATENT DOCUMENTS

CN     111176268 A  *  5/2020
EP     3626568 A1  *  3/2020
(Continued)

OTHER PUBLICATIONS

Artificial Intelligence for Vehicle-to-Everything: A Survey, Jan. 7, 2019, Tong et al. , IEEE Access (vol. 7, pp. 10823-10843).*
(Continued)

*Primary Examiner* — Khoi H Tran
*Assistant Examiner* — Jorge O Peche
(74) *Attorney, Agent, or Firm* — Womble Bond Dickinson (US) LLP

(57) ABSTRACT

A learning based speed planner for autonomous driving vehicles (ADV) is disclosed. An ADV is set into human-driving mode. Driving control elements are under control of a human driver, and other ADV logic is enabled. The ADV plans a route path on a segment of the route having an obstacle. ADV logic generates a station-time graph for the path of the segment, and a grid of cells to encompass the path and obstacle. A feature vector is generated from the grid. Human driving behavior is recorded as the ADV is navigated along the path. Recorded driving data for a large plurality of paths, obstacles and ADVs is transmitted to a server to generate a speed model. The speed model is downloaded to one or more ADVs for use in autonomous driving mode, to determine an initial speed to use in similar driving situations.

18 Claims, 9 Drawing Sheets

(52) U.S. Cl.
CPC ......... *G05D 1/0214* (2013.01); *G05D 1/0221* (2013.01); *G05D 1/0223* (2013.01); *B60W 2050/0008* (2013.01); *B60W 2050/0077* (2013.01); *G05D 2201/0213* (2013.01)

(58) Field of Classification Search
CPC ......... G05D 2201/0213; G05D 1/0236; G05D 1/024; G05D 1/0242; G05D 1/0246; G05D 1/0255; G05D 1/0257; G05D 1/0259; G05D 1/0278; G05D 1/028; G05D 1/0276; B60W 50/0098; B60W 2050/0077; B60W 2050/0008
See application file for complete search history.

(56) References Cited

U.S. PATENT DOCUMENTS

| | | | | |
|---|---|---|---|---|
| 7,788,614 B1* | 8/2010 | Galloway | ............ | G06F 30/392 716/113 |
| 9,798,327 B2* | 10/2017 | Albaghajati | ............ | G01V 1/168 |
| 9,946,266 B2* | 4/2018 | Sarid | ............ | G01S 7/4802 |
| 10,303,178 B1* | 5/2019 | Gutmann | ............ | B60W 30/09 |
| 10,309,790 B2* | 6/2019 | Konishi | ............ | B60W 30/12 |
| 10,311,324 B1* | 6/2019 | Kim | ............ | G06K 9/4604 |
| 10,496,104 B1* | 12/2019 | Liu | ............ | G01S 5/16 |
| 10,509,947 B1* | 12/2019 | Douillard | ............ | G06T 7/10 |
| 10,571,925 B1* | 2/2020 | Zhang | ............ | G05D 1/0246 |
| 10,571,926 B1* | 2/2020 | Zhang | ............ | G05D 1/0219 |
| 10,572,717 B1* | 2/2020 | Zhu | ............ | G06T 7/231 |
| 10,579,065 B2* | 3/2020 | Wang | ............ | G05D 1/0088 |
| 10,593,042 B1* | 3/2020 | Douillard | ............ | G06K 9/34 |
| 2001/0014124 A1* | 8/2001 | Nishikawa | ............ | H04N 5/145 375/240.16 |
| 2002/0181706 A1* | 12/2002 | Matsumura | ............ | H04N 19/467 380/205 |
| 2004/0204792 A1* | 10/2004 | Taylor | ............ | A47L 9/2831 700/245 |
| 2005/0000543 A1* | 1/2005 | Taylor | ............ | G05D 1/0219 134/18 |
| 2005/0010331 A1* | 1/2005 | Taylor | ............ | G05D 1/0219 700/245 |
| 2005/0189471 A1* | 9/2005 | Nagasawa | ............ | G06T 7/254 250/208.1 |
| 2005/0273967 A1* | 12/2005 | Taylor | ............ | G05D 1/0227 15/319 |
| 2006/0171562 A1* | 8/2006 | Yoshida | ............ | G06K 9/00805 382/104 |
| 2006/0293792 A1* | 12/2006 | Hasegawa | ............ | G05D 1/0274 700/245 |
| 2007/0027612 A1* | 2/2007 | Barfoot | ............ | G05D 1/024 701/117 |
| 2007/0156286 A1* | 7/2007 | Yamauchi | ............ | G05D 1/0251 700/245 |
| 2008/0027591 A1* | 1/2008 | Lenser | ............ | G05D 1/0251 701/2 |
| 2008/0046125 A1* | 2/2008 | Myeong | ............ | G05D 1/0274 700/253 |
| 2009/0141027 A1* | 6/2009 | Sato | ............ | G06K 9/2036 345/426 |
| 2010/0211244 A1* | 8/2010 | Jeong | ............ | G06T 19/003 701/25 |
| 2011/0026811 A1* | 2/2011 | Kameyama | ............ | G06T 3/4053 382/159 |
| 2011/0289028 A1* | 11/2011 | Sato | ............ | G06K 9/623 706/12 |
| 2012/0221237 A1* | 8/2012 | Jung | ............ | G05D 1/0274 701/400 |
| 2013/0129148 A1* | 5/2013 | Nanri | ............ | G06T 7/11 382/103 |
| 2015/0293216 A1* | 10/2015 | O'Dea | ............ | G01S 13/87 701/23 |
| 2015/0353083 A1* | 12/2015 | Hasberg | ............ | G06T 11/203 701/1 |
| 2016/0021386 A1* | 1/2016 | Fishwick | ............ | H04N 19/167 375/240.16 |
| 2016/0297072 A1* | 10/2016 | Williams | ............ | B25J 9/1694 |
| 2017/0116487 A1* | 4/2017 | Yamazaki | ............ | G06T 7/285 |
| 2017/0329347 A1* | 11/2017 | Passot | ............ | G05D 1/0088 |
| 2018/0107226 A1* | 4/2018 | Yang | ............ | G05D 1/0246 |
| 2018/0143647 A1* | 5/2018 | Wang | ............ | G05D 1/0274 |
| 2018/0246520 A1* | 8/2018 | Martinson | ............ | G05D 1/0094 |
| 2018/0267540 A1* | 9/2018 | Sonoura | ............ | G05D 1/0221 |
| 2018/0314265 A1* | 11/2018 | Matsuno | ............ | G05D 1/0248 |
| 2018/0339710 A1* | 11/2018 | Hashimoto | ............ | G05D 1/0223 |
| 2019/0087667 A1* | 3/2019 | Foroughi | ............ | G01S 5/0294 |
| 2019/0113927 A1* | 4/2019 | England | ............ | G05D 1/0231 |
| 2019/0150357 A1* | 5/2019 | Wu | ............ | A01C 21/00 |
| 2019/0258878 A1* | 8/2019 | Koivisto | ............ | G05D 1/00 |
| 2019/0265711 A1* | 8/2019 | Dey | ............ | G01C 21/206 |
| 2019/0354106 A1* | 11/2019 | Gupta | ............ | G05D 1/0219 |
| 2019/0371052 A1* | 12/2019 | Kehl | ............ | G06K 9/6256 |
| 2019/0384302 A1* | 12/2019 | Silva | ............ | G05D 1/0088 |
| 2019/0384309 A1* | 12/2019 | Silva | ............ | G01S 17/86 |
| 2020/0023192 A1* | 1/2020 | Lee | ............ | A61B 5/0064 |
| 2020/0074233 A1* | 3/2020 | England | ............ | G06K 9/6256 |
| 2020/0074266 A1* | 3/2020 | Peake | ............ | G01S 17/931 |
| 2020/0103523 A1* | 4/2020 | Liu | ............ | G01S 13/867 |
| 2020/0148215 A1* | 5/2020 | Mohajerin | ............ | G06N 3/08 |
| 2020/0264626 A1* | 8/2020 | Wang | ............ | G05D 1/0238 |
| 2021/0064040 A1* | 3/2021 | Yadmellat | ............ | G05D 1/0212 |

FOREIGN PATENT DOCUMENTS

| | | |
|---|---|---|
| EP | 3339126 B1 * | 4/2020 |
| JP | 2014137743 | 7/2014 |
| JP | 2016115334 | 6/2016 |
| JP | 2017162438 | 9/2017 |
| JP | 2018026009 | 2/2018 |
| JP | 2019-204509 A * | 11/2019 |

OTHER PUBLICATIONS

Mapping for Autonomous Driving: Opportunities and Challenges, Oct. 2, 2020, Wong et al., IEEE Intelligent Transportation Systems Magazine (vol. 13, Issue: 1, pp. 91-106).*

Human-driver speed profile modeling for autonomous vehicle's velocity strategy on curvy paths, Jun. 1, 2016, Geng et al., 2016 IEEE Intelligent Vehicles Symposium (IV) (pp. 755-760).*

"Conversion of 2d array in to vector," MathWorks MATLAB Answers, Jul. 20, 2012, 3 pages.

"Convert 2d array to vector," Stack Overflow, 2014, 2 pages.

* cited by examiner

LEARNING BASED SPEED PLANNER FOR AUTONOMOUS DRIVING VEHICLES

TECHNICAL FIELD

Embodiments of the present disclosure relate generally to operating autonomous vehicles. More particularly, embodiments of the disclosure relate to speed planning for navigating an autonomous driving vehicles (ADVs) in the presence of potential obstacles.

BACKGROUND

Speed planning is important when navigating an autonomous driving vehicle (ADV) around one or more obstacles on the ADV's chosen route. In the prior art, speed planning methods use dynamic programming or quadratic programming to optimize speed for an ADV. The prior art methods are computationally very expensive and difficult to match to human driving behaviors.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
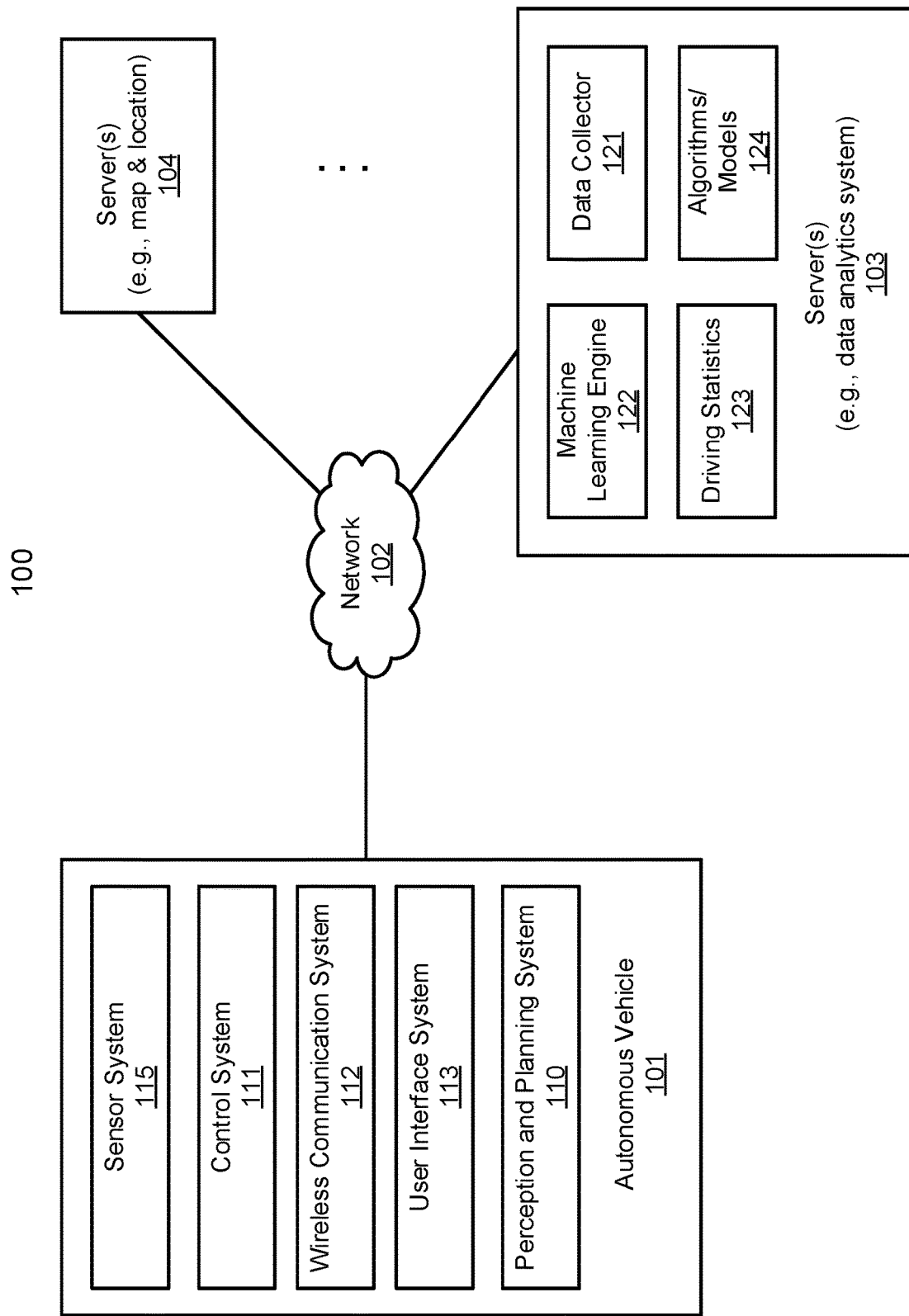
FIG. 1 is a block diagram illustrating a networked system for implementing a learning based speed planner for autonomous driving vehicles (ADVs), according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, initial speed data is collected from an ADV driven by a human driver, in view of one or more obstacles and a segment of a navigation route (termed, "a path"). The ADV is set to human driving mode. In human driving mode a control system of the ADV is bypassed so that a human can control the ADV. Other ADV logic remains enabled and operational. A path is determined by a planning module of the ADV. One or more obstacles along the path are determined by a perception module of the ADV. A station-time (S-T) graph is generated and a K×P grid of cells that encompass the path and at least a portion of the obstacle(s). Cells that coincide with an obstacle are set to a first value, e.g. 1. Other cells are set to a second value, e.g. 0. The grid of cells is transformed to a feature vector, F, of length K×P. The ADV records an initial speed $v_0$, chosen by the human driver, recorded at the starting point of the path, at grid cell (0,0). The initial speed, $v_0$, and feature vector, F, are recorded as a driving record for transmission to a remote server. In an embodiment, driving records are transmitted to the remote server in real-time or near real-time. In an embodiment, driving records can be stored at the ADV for transmission to the remote server at a later time.

In an embodiment, a method of machine-learning one or more speed models is implemented on a remote server. The remote server receives and stores a large plurality of driving records from a large plurality of ADVs driving in driven by human drivers in human driving mode. The driving records each include a feature vector, F, representing one or more obstacles to an ADV along portion of a navigation route (a "path"), and an initial speed $v_0$ chosen by a human driver at a first point in the path. The feature vector, F, represents a K×P grid of cells that encompass the path and at least a portion of the one of more obstacles on the path. The remote server can select a plurality, N, of driving records from the large plurality of driving records and use machine learning to train an initial speed model $W_{MODEL}$. The remote server can transmit the speed model $W_{MODEL}$ to one or more ADVs. $W_{MODEL}$ can be represented as a speed model vector.

In another embodiment, an ADV can receive a speed models, $W_{MODEL}$, from a remote server. In autonomous driving mode, the ADV can determine a path that the ADV is to navigate, in view of one or more obstacles along the path. The ADV can map the obstacles into a K×P grid of cells each having a value. In an embodiment, the ADV can set a grid cell value to 1 if the grid cell coincides with an obstacle. Otherwise the grid cell is set to 0. The ADV can then generate a feature vector, F', of K×P length from the grid cells. In an embodiment, $v_0$ can be determined from the dot product of F' transpose ($F'^T$) and $W_{MODEL}$. The ADV can then autonomously navigate the path, beginning at speed $v_0$, at the initial point of the path, in view of the obstacles represented by feature vector F'. In an embodiment, $W_{MODEL}$ can be, alternatively, trained to determine an initial acceleration $a_0$. An initial acceleration $a_0$ for navigating the path can be determined from the dot product of F' transpose ($F'^T$) and $W_{MODEL}$.

FIG. 1 is a block diagram illustrating a networked system for implementing a learning based speed planner for autonomous driving vehicles (ADVs), according to one embodiment. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
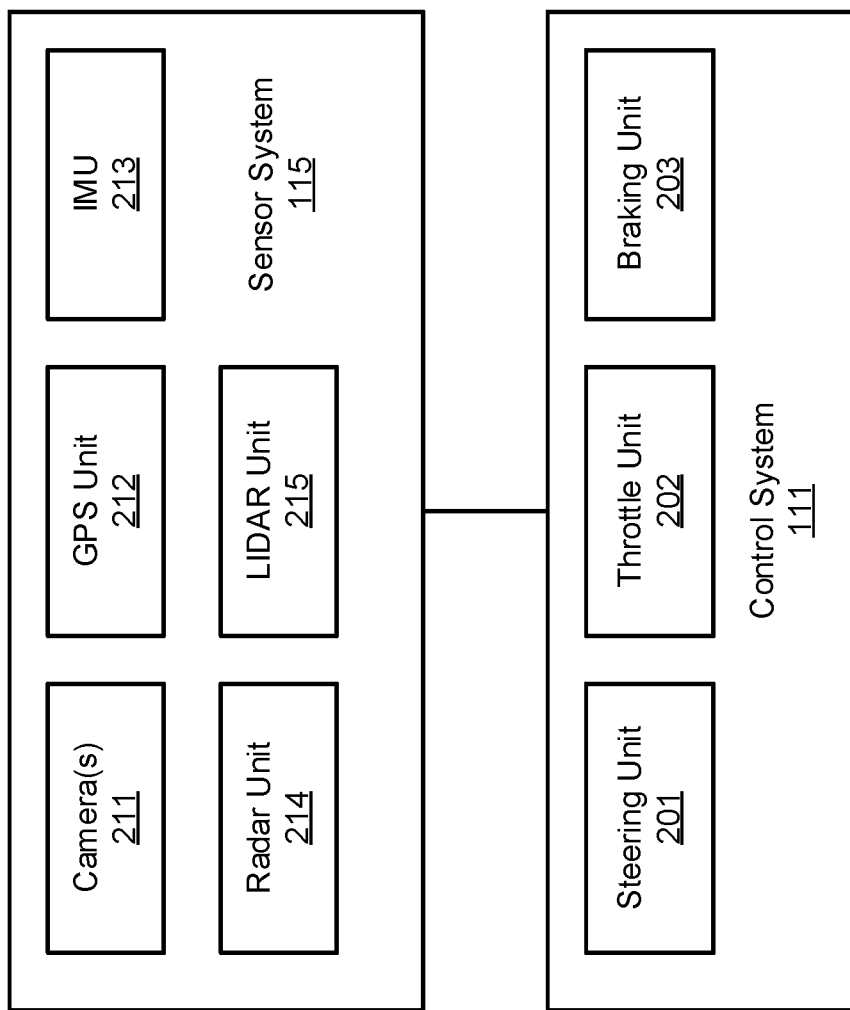
FIG. 2 is a block diagram illustrating an example of an autonomous vehicle for implementing a learning based speed planner for autonomous driving vehicles (ADVs), according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. Cameras 211 may include an infra-red camera. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof. Control system 111 can include logic to detect failure of each control in the control system 111, as described below with reference to FIG. 3.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently. An optimal route can include a plurality of segment, each of which can be optimized by the perception and planning system 110 by determining an optimal path curve for the segment from a plurality of candidate path curves for the segment, each generated by the perception and planning system 110.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In an embodiment, driving statistics can include driving records when the ADV is in human driver mode. Human driving mode bypasses the ADV control system logic so that a human driver can control the ADV. In an embodiment, driving records can be used to learn human driving judgments using machine learning engine 122. A navigation path can be determined for a segment of an ADV driving route which the human driver will navigate. The path can have one or more obstacles. A grid of cells can be generated that encompasses the path and at least a portion of the obstacle(s). Cells that coincide with an obstacle can be set to 1, and all other cells set to 0. The grid of cells can be represented as a feature vector, F. As an ADV 101 begins to navigate the path under human control, the feature vector F and initial ADV speed, $v_0$, and/or initial acceleration $a_0$, can be stored as driving records and transmitted to a remote server, such as server 103, with a machine learning algorithm 124 using machine learning engine 122.

Based on driving statistics 123, machine learning engine 122 generates or trains a set of rules, algorithms, and/or predictive models 124 for a variety of purposes, including multi-level alarming algorithms for an alarm system to alarm drivers of the autonomous driving vehicles. For example, machine learning engine 122 can train a speed model, $W_{MODEL}$, 124 using a large plurality of ADV driving statistics 123. The trained speed model $W_{MODEL}$ 124 can be downloaded to one or more ADVs to improve initial speed selection $v_0$ or an initial acceleration $a_0$ when an ADV begins navigating a path having feature vector, F.

Figure 3:
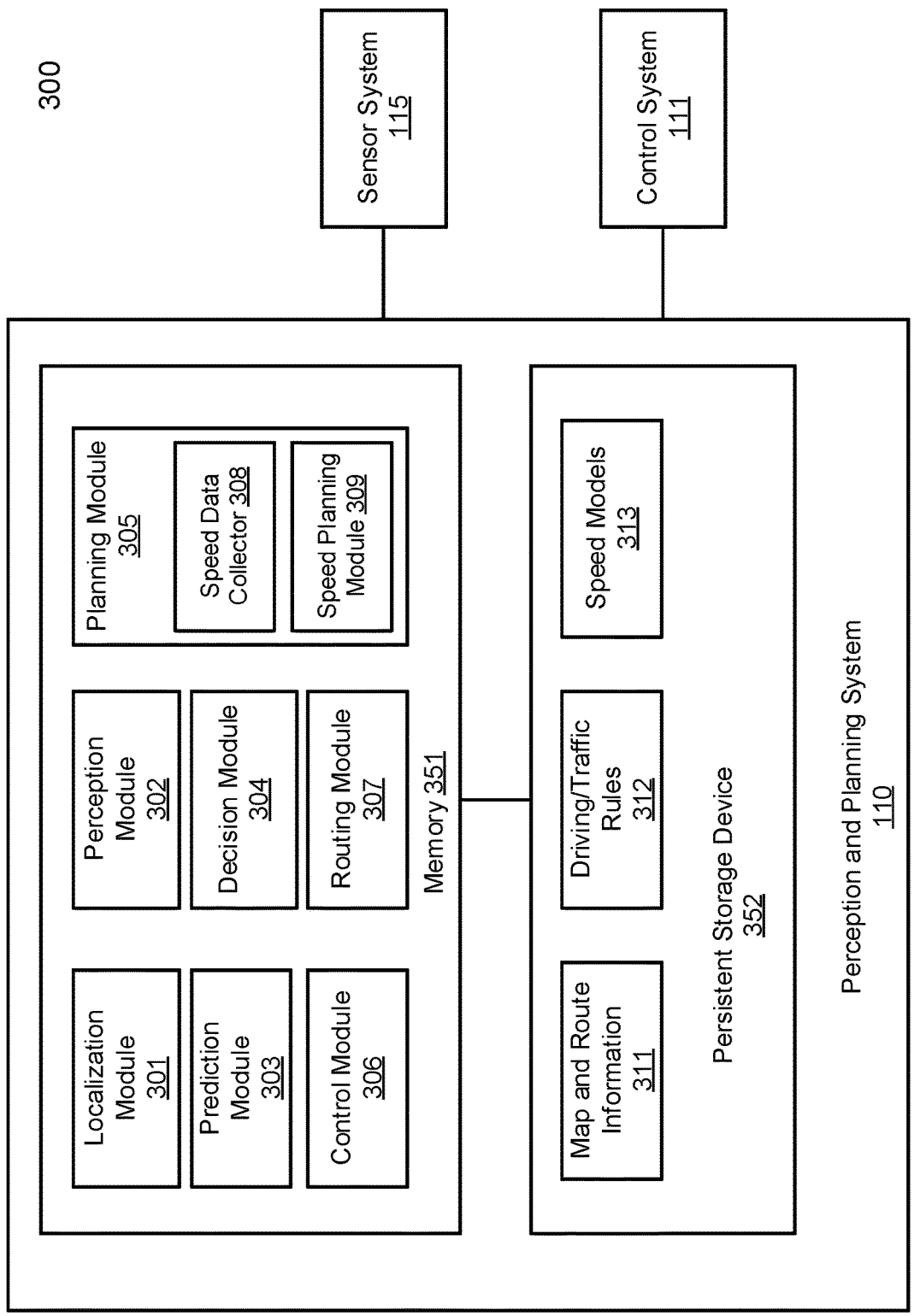
FIG. 3 is a block diagram illustrating an example of a perception and planning system in an ADV that implements a learning based speed planner for autonomous driving vehicles (ADVs), according to one embodiment.

FIG. 3 is a block diagram illustrating an example of a perception and planning system in an ADV that implements a learning based speed planner for autonomous driving vehicles (ADVs), according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, routing module 307, speed data collector 308, and speed planning module 309. Localization module 301 can include map and route data 311 and routing module 307.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 may be referred to as a map and route module. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, and the least path curve determined from the plurality of candidate path curves for a driving segment of a route, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle. Control module 306 can be bypassed such that a human driver can control the ADV while other logic of the ADV remains operational.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time. Examining all of the possible routes can include, for a route selected from the possible route, determining a segment of the selected route, and determining a plurality of candidate path curves for navigating the segment of the selected route. Navigating a driving segment (or "path") can include determining an initial speed, $v_0$, for the ADV when beginning the path. The initial speed $v_0$ can depend upon one or more obstacles on the path. Speed data collected while a human is driving in human driver mode can be used to train one or more speed models, using machine learning, to emulate human decision making for the initial speed $v_0$.

Speed data collector 308 records certain driving conditions into driving records. In human driver mode, an ADV can navigate along a path having one or more obstacles. The path can be represented as a station-time (S-T) graph comprising a grid of cells of values that encompass the path and at least a portion of the one or more obstacles. The one or more obstacles to the ADV can be incorporated into the grid of cells by, e.g., setting a grid cell value to 1 where the grid cell coincides with an obstacle, and otherwise setting the grid cell to 0. The grid of cells can be represented as a feature vector, F. With the ADV set in human driver mode, the human driver can begin driving the path at an initial speed, $v_0$. Speed data collector 308 can record the feature vector F and initial speed $v_0$ into a driving record. Speed data collector 308 can record a driving record for each of multiple paths along a driving route. In an embodiment, a feature vector F and initial driving speed $v_0$, and/or initial acceleration $a_0$, can be determined more than once for each segment of a driving route. In an embodiment, a new feature vector F and initial speed $v_0$ and/or initial acceleration $a_0$, can be recorded in response to a change in the one or more obstacles on the path, such as an obstacle entering or leaving the area comprising the grid of cells encompassing the path. Recorded driving records can be transmitted from the ADV to a remote server in real-time or near real-time. In an embodiment, recorded driving records can be transmitted to the remote server in a batch at a specified time or upon an event, such as the ADV reaching a destination on route. The remote server, e.g. server 103 of FIG. 1, can be used to train a speed models for later downloading to one or more ADVs to improve speed planning in an ADV in autonomous driving mode. Speed planning can be performed by speed planning module 309.

Speed planning module 309 can receive a speed model, $W_{MODEL}$, from remote server 103. A speed model $W_{MODEL}$ is used by speed planning module 309 to determine an initial speed $v_0$ or initial acceleration $a_0$ to begin driving an ADV on a path in autonomous driving mode, in view of one or more obstacles to the ADV represented in a feature vector, F'. Speed planning module 309 can use feature vector F' and speed model $W_{MODEL}$ to determine an initial speed $v_0$ or acceleration $a_0$ to start driving on the path. In an embodiment, the initial speed $v_0$ or initial acceleration $a_0$ can be determined by computing the dot product of F' transpose ($F'^T$) and $W_{MODEL}$.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
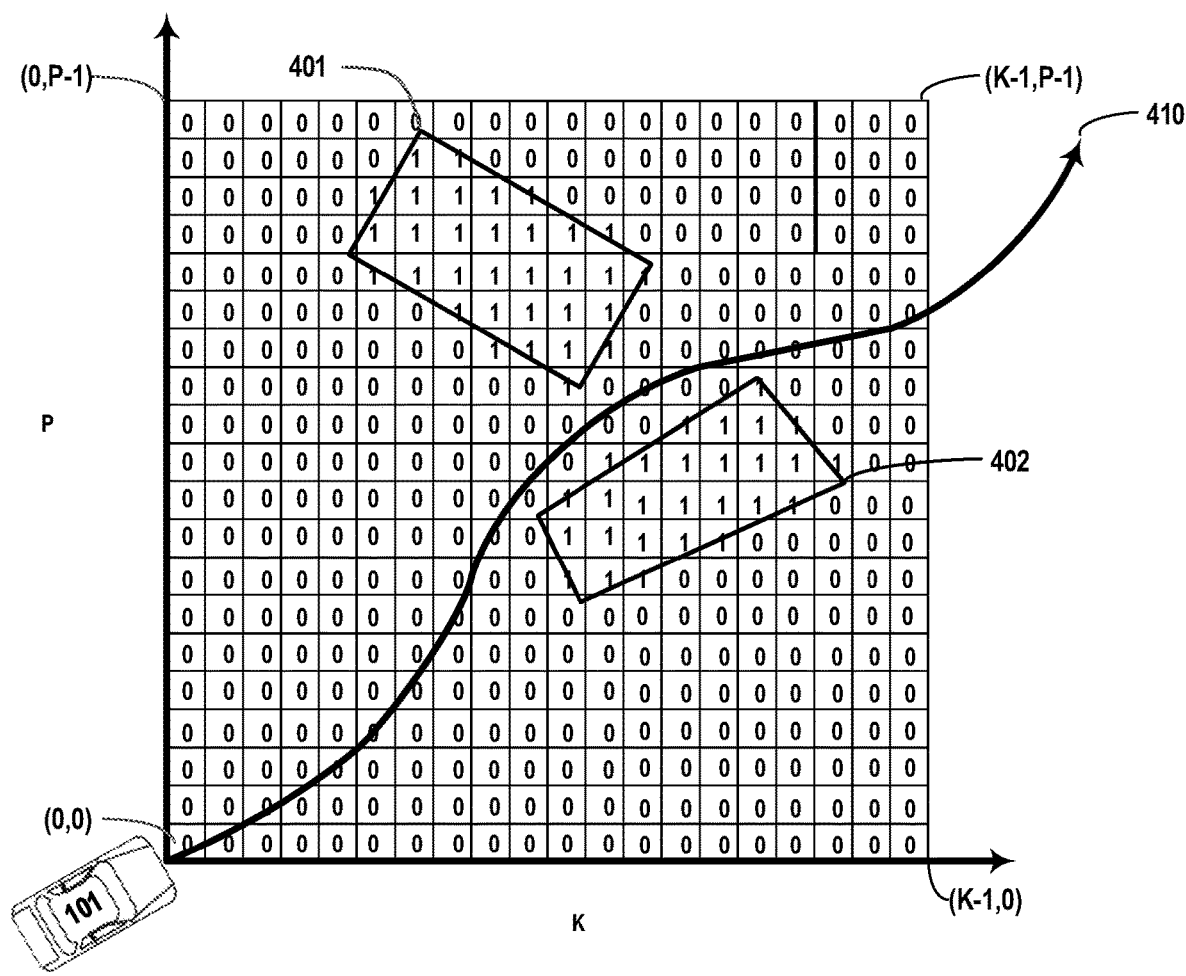
FIG. 4 illustrates an example ADV path through a segment of an ADV route, navigated by a human driver, in view of a plurality of obstacles along the path for implementing a learning based speed planner for autonomous driving vehicles (ADVs) according to one embodiment.

FIG. 4 illustrates an example ADV path through a segment of an ADV route, in view of a plurality of obstacles along the path for implementing a learning based speed planner for autonomous driving vehicles (ADVs) according to one embodiment. In FIG. 4, a driving path 410 is shown passing between a first obstacle 401 and a second obstacle 402. Obstacles 401 and 402 can be determined by perception module 302 perceiving the obstacles and prediction module 303 predicting the obstacle behavior. In view of the obstacles and obstacle behavior, planning module 305 can determine path 410 to navigate around the obstacles 401 and 402. The obstacles can be represented in a grid of cells that encompass the path and at least a portion of the obstacles 401 and 402. Grid cells that coincide with an obstacle can be set to a value of 1 and remaining grid cells can be set to a value of 0. The grid can be of size K×P cells. The grid of cells can be represented as a feature vector F, having length K×P.

FIG. 4 can be applied to a data collection scenario wherein the ADV is in human driver mode, the feature vector F is generated, and a human driver selects an initial speed, $v_0$, to begin driving the path, starting at point (0,0) on the grid of cells. Driving data records are recorded by speed data collector 308. FIG. 4 can also be applied to a speed planning scenario, wherein the ADV is in autonomous driving mode, and a feature vector F' and speed model $W_{MODEL}$ are used by speed planning module 309 to determine initial speed $v_0$ or initial acceleration $a_0$ for navigating the path 410 in autonomous driving mode.

Figure 5:
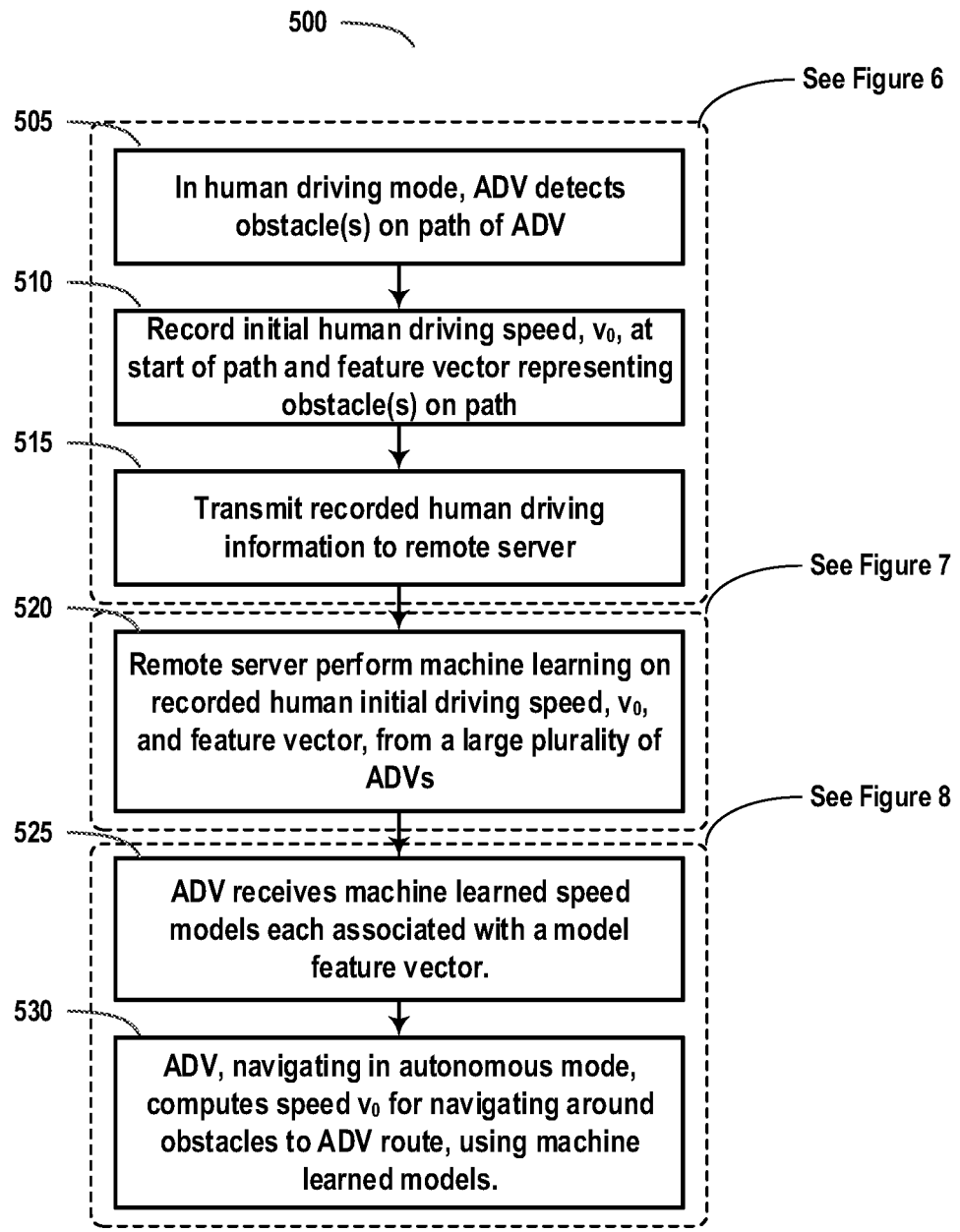
FIG. 5 is a block diagram illustrating a method of implementing a learning based speed planner for autonomous driving vehicles (ADVs), according to one embodiment.

FIG. 5 is a flow diagram illustrating a method 500 of implementing a learning based speed planner for autonomous driving vehicles (ADVs), according to one embodiment.

In operation 505, an ADV 101 can be set into human driving mode. Human driving mode bypasses the control module 306 so that the human driver can control the ADV, while all other ADV logic continues to be active. The ADV planning module 305 can generate a path that the human driver is to navigate. Perception module 302 and prediction module 303 can detect one or more obstacles to the ADV along the path and predict the behavior of the obstacles. ADV logic can generate a grid of cells encompassing the path and at least a portion of the obstacles. Grid cells that coincide with an obstacle can be set to a value of 1. Remaining grid cells can be set to 0. The grid of cells can be represented as a feature vector, F.

In operation 510, the human driver begins driving ADV on the path at an initial speed of $v_0$. Speed data collection module 308 can record the feature vector and initial speed $v_0$ and/or initial acceleration $a_0$ into a driving record. In operation 515, the driving record can be transmitted to a remote server. In an embodiment, the transmission of one or more driving records can be in real-time, near real-time, or can be delayed until a later time. Operations 505 through 515 are described in additional detail below, with reference to FIG. 6.

In operation 520, the remote server can query driving records received from a large plurality of ADVs, each driving record including a feature vector F and initial speed $v_0$ and/or acceleration $a_0$, for a large plurality of driving paths and obstacles. Remote server, e.g. server 103, can perform machine learning of speed models for a large plurality feature vectors F and associated initial speeds $v_0$. Operation 520 is described in greater detail below, with reference to FIG. 7.

In operation 525, remote server can transmit, or otherwise make available for download, a speed model, $W_{MODEL}$, to one or more ADVs. For a new driving situation for an ADV having a feature vector F', speed model $W_{MODEL}$ and feature vector F' can be used to determine an initial speed $v_0$ or initial acceleration $a_0$ to begin navigating the ADV on the path in autonomous driving mode.

In operation 530, while driving in autonomous driving mode, the ADV computes the initial speed $v_0$ for navigating the path in view of the obstacles in feature vector F'. In an embodiment, computing $v_0$ includes computing the dot product of the transpose of feature vector F' ($F'^T$) and $W_{MODEL}$. Operations 525 and 530 are described in more detail, below, with reference to FIG. 8.

Figure 6:
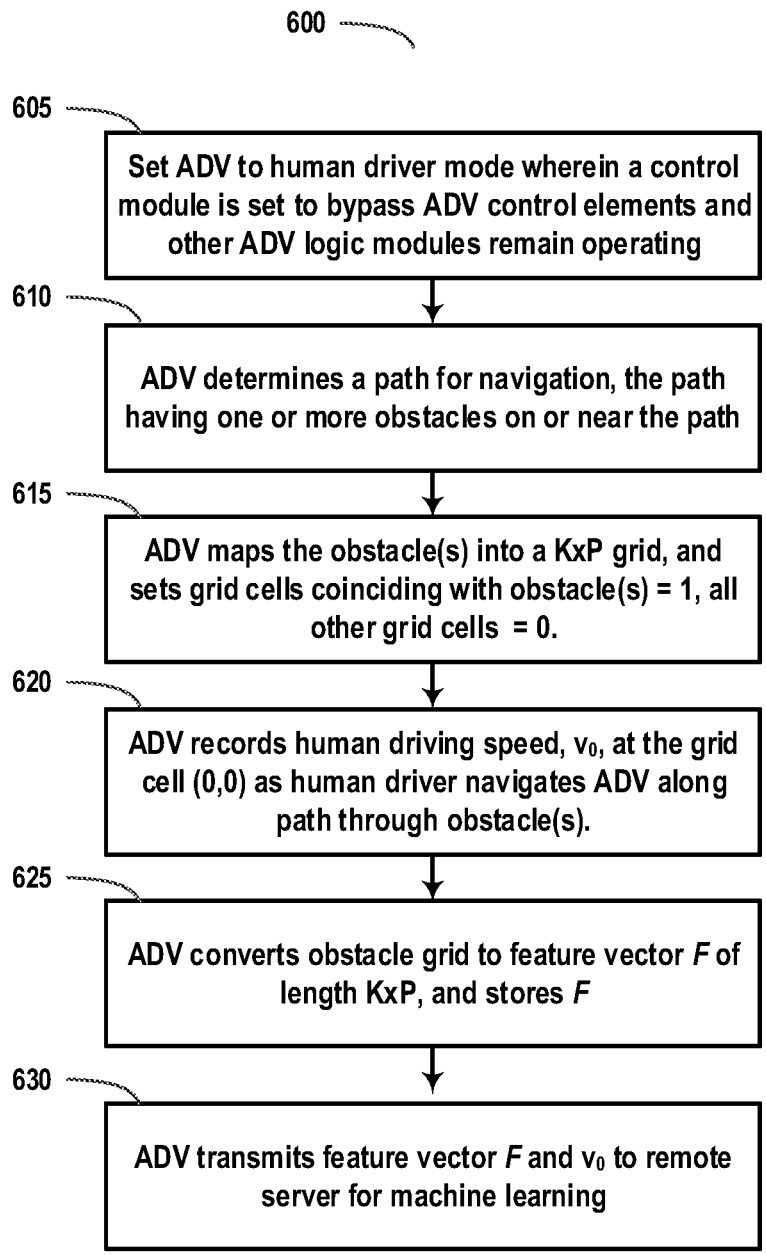
FIG. 6 is a block diagram illustrating a method of recording human driving in an ADV for implementing a learning based speed planner for autonomous driving vehicles (ADVs), according to one embodiment.

FIG. 6 is a flow diagram illustrating a method 600 of recording human driving data in an ADV for implementing a learning based speed planner for autonomous driving vehicles (ADVs), according to one embodiment. In operation 605, the ADV is set into human driver mode. In human driver mode, the control unit 306 is bypassed so that the human driver can perform control functions such as steering, braking, and throttle control. Other modules of ADV logic remain operational.

In operation 610, the ADV the planning module 305 plans a route for navigation and routing module 307 can provide a path comprising a portion of the route. Perception module 302 can detect one or more obstacles along the path and prediction module 303 can predict behavior of the one or more obstacles.

In operation 615, the ADV maps the one or more obstacles into a K×P grid of cells that encompasses the path and at least a portion of the one or more obstacles. A grid cell that coincides with an obstacle can have a value of 1 and otherwise have a value of 0.

In operation 620, the ADV speed data collector 308 records the initial speed $v_0$ and/or initial acceleration $a_0$, selected by the human driver, as the ADV begins navigating the path through the obstacles.

In operation 625, ADV logic can convert the grid of cells into a feature vector F having dimension K×P, and store the feature vector F in a driving record in association with initial speed $v_0$ and/or initial acceleration $a_0$.

In operation 630, the ADV can transmit speed driving records, each comprising a feature vector F and an initial speed $v_0$ and/or initial acceleration $a_0$ to a remote server for machine learning of one or more speed models, $W_{MODEL}$.

Figure 7:
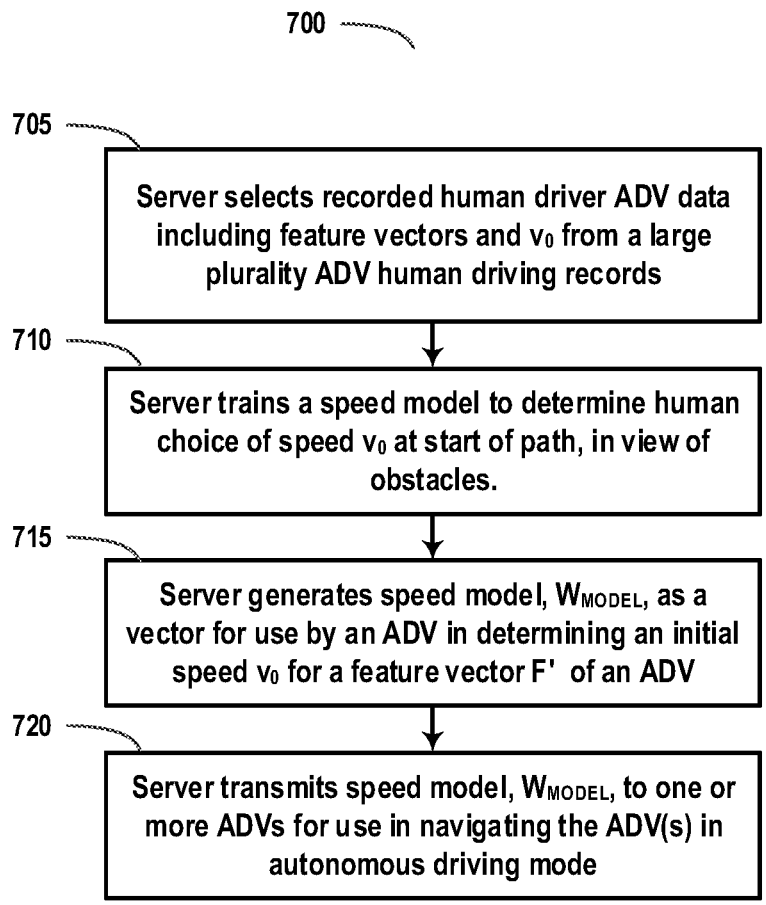
FIG. 7 is a block diagram illustrating a remote server training speed models from human driver data of ADVs for implementing a learning based speed planner for autonomous driving vehicles (ADVs), according to one embodiment.

FIG. 7 is a flow diagram illustrating a method 700 of a remote server training a speed model $W_{MODEL}$ from human driver data of ADVs for implementing a learning based speed planning module 309 for autonomous driving vehicles (ADVs), according to one embodiment. Speed model $W_{MODEL}$ can be represented as a vector. The term $W_{MODEL}$ is used to mean a speed model in any representation, including as a vector.

In operation 705, the server selects N ADV driving records generated during human driver mode of a large plurality of ADVs. Each driving record can comprise a feature vector, F, and an initial speed $v_0$ and/or an initial acceleration $a_0$. The feature vector represents a mapping of one or more obstacles to an ADV on a path. The initial speed $v_0$ was chosen by the human driver when beginning to drive along the path. In an embodiment, selecting driving records can include selecting driving records having identical, or substantially identical, feature vectors F such that a speed model $W_{MODEL}$ is trained for a specific set of obstacle(s). Such an embodiment may be used under a variety of situations, such as when the set of obstacles poses a known difficult or risky driving situation. In such case, a particular $W_{MODEL}$ may be stored in association with a representative corresponding $F_{MODEL}$ for which $W_{MODEL}$ was generated, so that the particular $W_{MODEL}$ corresponding to $F_{MODEL}$ may be determined in an ADV driving situation wherein the ADV feature vector, F', corresponds to $F_{MODEL}$. In operation 710, the server uses the selected driving records to train speed model, $W_{MODEL}$. Training speed model $W_{MODEL}$ includes determining $W_{MODEL}$ that minimizes the summation $\Sigma_{i=1}^{N}(F_i^T W_{MODEL} - v_i)^2$, wherein $F_i^T$ is the transpose of $F_i$, $F_i$ is the $i^{th}$ selected feature vector, and $v_i$ is the $i^{th}$ initial speed $v_0$ at the origin of a path driven by a human driver of an ADV in view of the one or more obstacles represented in the feature vector $F_i$. In operation 715, server generates the speed model $W_{MODEL}$ as a vector of length K×P for use by an ADV in autonomous driving mode to determine an initial speed $v_0$ for driving a path having a feature vector F'. In operation 720, server transmits speed model $W_{MODEL}$ to one or more ADVs for use in speed planning for navigating a path of an ADV in autonomous driving mode.

Figure 8:
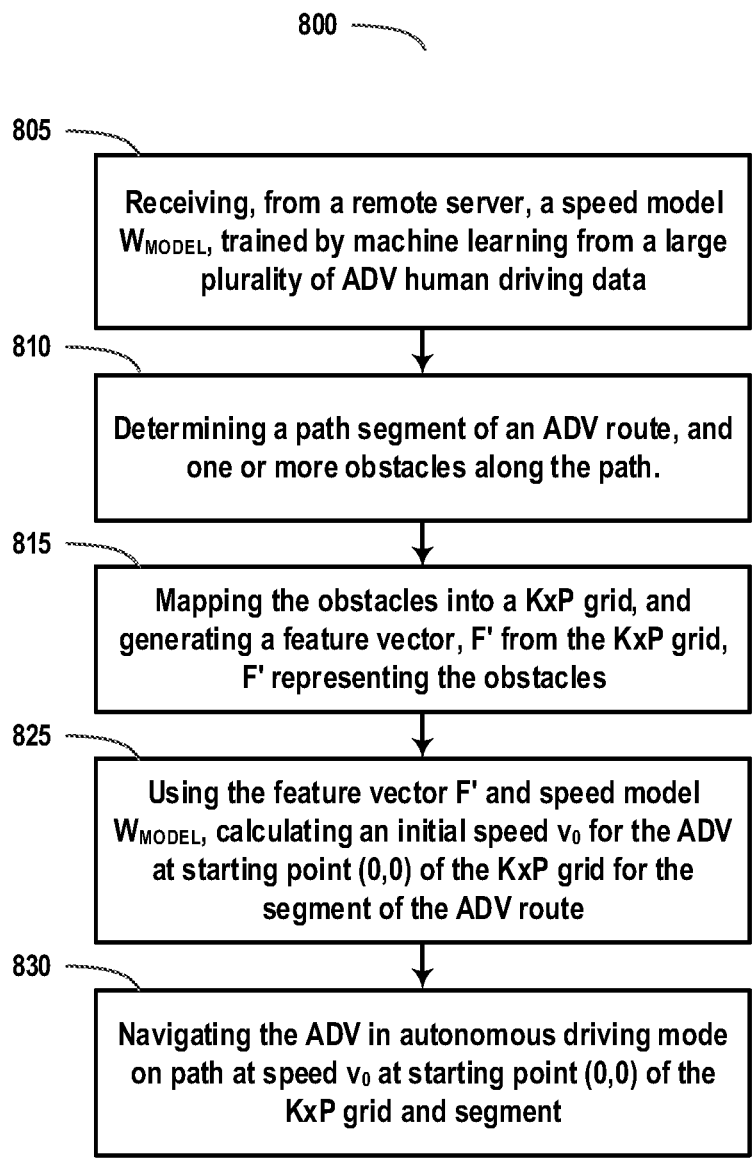
FIG. 8 is a block diagram illustration a method of improving ADV navigation by implementing a learning based speed planner for autonomous driving vehicles (ADVs), according to one embodiment.

FIG. 8 is a flow diagram illustration a method 800 of improving ADV navigation by implementing a learning based speed planner for autonomous driving vehicles (ADVs), according to one embodiment. Method 800 is practiced by an ADV in autonomous driving mode. In operation 805, an ADV receives from a remote server a speed model, $W_{MODEL}$. $W_{MODEL}$ was trained by the remote server from a large plurality of driving records each having a feature vector and initial speed $v_0$ and/or initial acceleration $a_0$.

In operation 810, the ADV perception and planning modules can determine a path that is a segment of route for the ADV to navigate, and one or more obstacles to the ADV along the segment of the route (or "path"). In operation 815, a grid of K×P cells can be generated that encompass the path and at least a portion of the obstacles. Grid cells that coincide with an obstacle can be set to a value of 1, while other grid cells are set to a value of 0. The grid of cells can be generated into a feature vector, F', representing the obstacles.

In operation 825, feature vector F' and speed model $W_{MODEL}$ are used by speed planning module 309 to calculate initial speed $v_0$ for beginning to navigate the path. Initial speed $v_0$ is calculated using the dot product of the transpose of F' ($F'^T$) and $W_{MODEL}$. In operation 830, the ADV, in autonomous mode, begins navigating the path at speed $v_0$, starting at point (0,0) of the K×P grid of cells that were used to generate feature vector F'.

Figure 9:
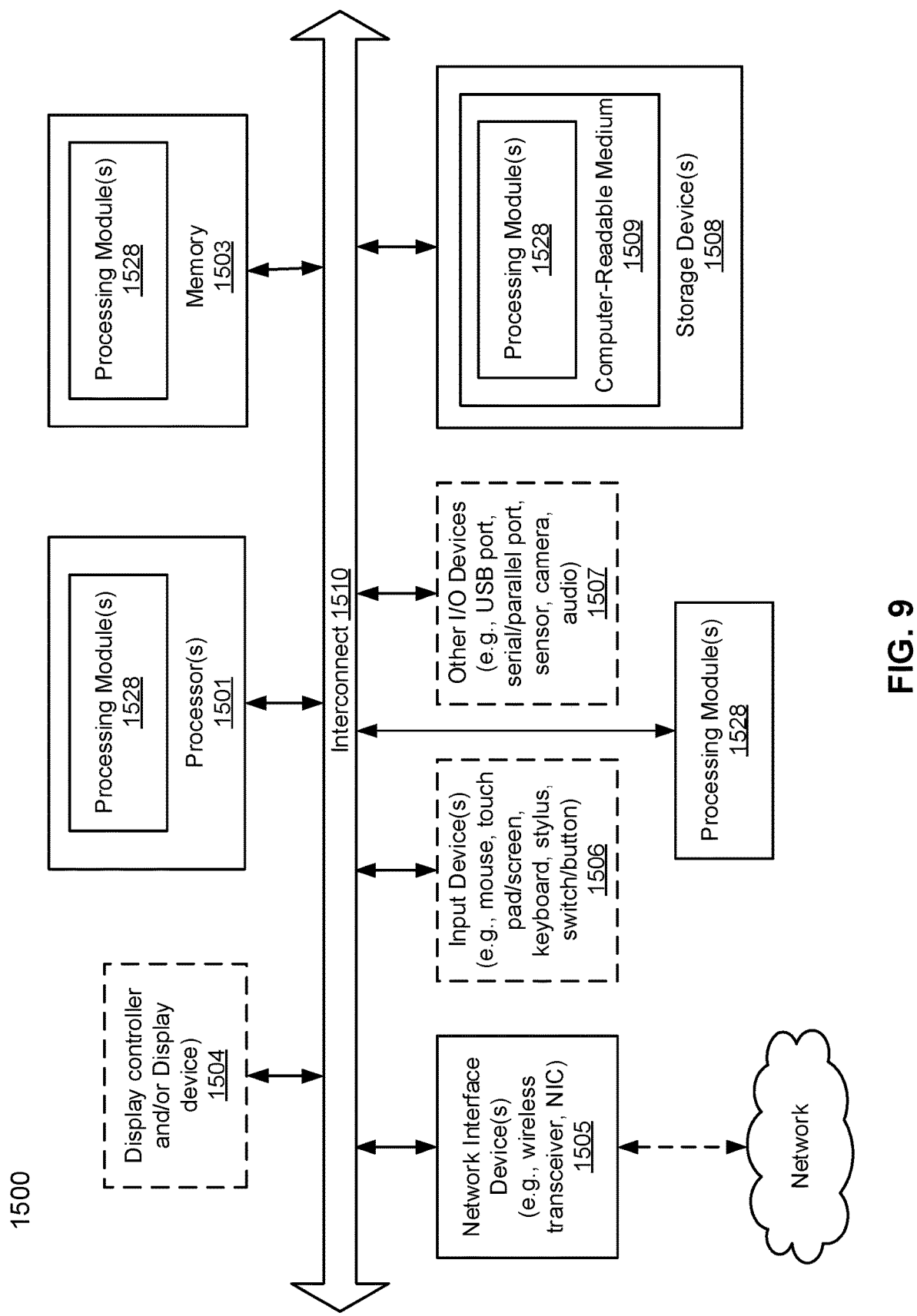
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or speed data collector 308, and speed planning module 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of efficient speed planning for navigating an autonomous driving vehicle (ADV) in autonomous driving mode, the method comprising:
   determining one or more obstacles in an area surrounding the ADV;
   determining a path that the ADV is to follow, in autonomous driving mode, in view of the one or more obstacles;
   generating a K column×P row grid of cells representing the area surrounding the ADV that encompasses the path that the ADV is to follow in autonomous driving mode in view of the one or more obstacles to the ADV;

setting each cell in the grid of cells that coincides with the one or more obstacles to a first value, and setting all other grid cells to a second value;

converting the K×P grid of cells, representing the area surrounding the ADV that encompasses the path that the ADV is to follow in autonomous driving mode in view of the one or more obstacles, to a feature vector, F', having length K times P, from all P rows of the grid of cells or all K columns of the grid of cells;

determining a speed model, $W_{MODEL}$, from a plurality of speed models received from a remote server, wherein each speed model in the plurality of speed models received from the remote server was trained on the remote server using a plurality of driving records each comprising a feature vector F and an initial speed v0, obtained from a plurality of ADVs driven in human driver mode, and wherein $W_{MODEL}$ is determined from the plurality of speed models received from the remote server for being associated with a feature vector $F_{MODEL}$ that most closely matches the feature vector F' of the ADV driven in autonomous mode;

determining an initial speed $v_0$ for navigating the ADV along the path in autonomous driving mode using feature vector F' generated by the ADV in autonomous driving mode and the determined speed model $W_{MODEL}$ that is associated with the feature vector $F_{MODEL}$ that most closely matches the feature vector F'; and navigating the path, by the ADV, in autonomous driving mode, at the initial speed of $v_0$.

2. The method of claim 1, wherein the grid of cells comprises a station-time (S-T) graph for the path.

3. The method of claim 1, wherein the first value is 1 and the second value is 0.

4. The method of claim 1, wherein determining the initial speed $v_0$ for the ADV to approach the one or more obstacles using the feature vector F' and the speed model $W_{MODEL}$ comprises computing a dot product of a transpose of F' ($F'^T$) and $W_{MODEL}$.

5. The method of claim 1, wherein $W_{MODEL}$ is received from a remote server and $W_{MODEL}$ was trained from driving records generated while the ADV was navigated by a human driver, each driving record including a feature vector F that represents one or more obstacles to a human-driven ADV and each driving record includes an initial path speed $v_0$ at which the human driver approached the one or more obstacles, the driving records obtained from each of a large plurality of human-driven ADV driving records, wherein F and $v_0$ can vary between driving records used to generate $W_{MODEL}$.

6. The method of claim 1, wherein the selecting determining further comprises:

determining the speed model, $W_{MODEL}$, from the plurality of speed models received from the remote server, having the associated feature vector $F_{MODEL}$ that most closely corresponds to F'.

7. A non-transitory computer-readable medium programmed with executable instructions that, when executed by a processing system, perform operations for efficient speed planning for navigating an autonomous driving vehicle (ADV) in autonomous driving mode, the operations comprising:

determining one or more obstacles in an area surrounding the ADV;

determining a path that the ADV is to follow, in autonomous driving mode, in view of the one or more obstacles;

generating a K column×P row grid of cells representing the area surrounding the ADV that encompasses the path that the ADV is to follow in autonomous driving mode in view of the one or more obstacles to the ADV;

setting each cell in the grid of cells that coincides with the one or more obstacles to a first value, and setting all other grid cells to a second value;

converting the K×P grid of cells, representing the area surrounding the ADV that encompasses the path at the ADV is to follow in autonomous driving mode in view of the one or more obstacles, to a feature vector, F', of having length K times P, from all P rows, or all K columns, of the K×P grid of cells;

determining a speed model, $W_{MODEL}$, from a plurality of speed models received from a remote server, wherein each speed model in the plurality of speed models received from the remote server was trained on the remote server using a plurality of driving records each comprising a feature vector F and a speed v0, obtained from a plurality of ADVs driven in human driver mode, and wherein $W_{MODEL}$ is selected determined from the plurality of speed models received from the remote server for being associated with a feature vector $F_{MODEL}$ that most closely matches the feature vector F' of the ADV driven in autonomous mode;

determining an initial speed $v_0$ for navigating the ADV along the path in autonomous driving mode using feature vector F' generated by the ADV in autonomous driving mode and the determined speed model $W_{MODEL}$ that is associated with the feature vector $F_{MODEL}$ that most closely matches the feature vector F'; and navigating the path, by the ADV, in autonomous driving mode, at the initial speed of $v_0$.

8. The medium of claim 7, wherein the grid of cells comprises a station-time (S-T) graph for the path.

9. The medium of claim 7, wherein the first value is 1 and the second value is 0.

10. The medium of claim 7, wherein determining the initial speed $v_0$ for the ADV to approach the one or more obstacles represented in the feature vector F', in autonomous driving mode, using the feature vector F' and the selected determined speed model $W_{MODEL}$, comprises computing the dot product of a transpose of F' ($F'^T$) and $W_{MODEL}$.

11. The medium of claim 7, wherein $W_{MODEL}$ is received from a remote server and $W_{MODEL}$ was trained from driving records generated while the ADV was navigated by a human driver, each driving record including a feature vector F that represents one or more obstacles to a human-driven ADV and an initial path speed $v_0$ used by the human driver to approach the one or more obstacles, the driving records obtained from each of a large plurality of human-driven ADV driving records, wherein F and $v_0$ can vary between driving records used to generate $W_{MODEL}$.

12. The medium of claim 7, wherein the selecting determining operation further comprises:

determining the $W_{MODEL}$ from a plurality of speed models received from the remote server, the $W_{MODEL}$ associated with the feature vector $F_{MODEL}$ that most closely corresponds to F'.

13. A system comprising a processing system having at least one hardware processor, the processing system coupled to a memory programmed with executable instructions that, when executed by the processing system perform operations for efficient speed planning for navigating an autonomous driving vehicle (ADV) in autonomous driving mode, the operations comprising:

determining one or more obstacles in an area surrounding the ADV;

determining a path that the ADV is to follow, in autonomous driving mode, in view of the one or more obstacles;

generating a K column×P row grid of cells representing the area surrounding the ADV that encompasses the path that the ADV is to follow in autonomous driving mode in view of one or more obstacles to the ADV;

setting each cell in the grid of cells that coincides with the one or more obstacles to a first value, and setting all other grid cells are set to a second value;

converting the K×P grid of cells, representing the area surrounding the ADV that encompasses the path that the ADV is to follow in autonomous driving mode in view of the one or more obstacles, to a feature vector, F', of having length K times P, from all P rows, or all K columns, of the K×P grid of cells;

determining a speed model, $W_{MODEL}$, from a plurality of speed models received from a remote server, wherein each speed model in the plurality of speed models received from the remote server was trained on the remote server using a plurality of driving records each comprising a feature vector F and a speed v0, obtained from a plurality of ADVs driven in human driver mode, and wherein $W_{MODEL}$ is selected determined from the plurality of speed models received from the remote server for being associated with a feature vector $F_{MODEL}$ that most closely matches the feature vector F' of the ADV driven in autonomous mode;

determining an initial speed $v_0$ for navigating the ADV along the path in autonomous driving mode using feature vector F' generated by the ADV in autonomous driving mode and the determined speed model $W_{MODEL}$ that is associated with the feature vector $F_{MODEL}$ that most closely matches the feature vector F'; and navigating the path, by the ADV, in autonomous driving mode, at the initial speed of $v_0$.

14. The system of claim 13, wherein the grid of cells comprises a station-time (S-T) graph for the path, the grid of cells is of size K×P.

15. The system of claim 13, wherein the first value is 1 and the second value is 0.

16. The system of claim 13, wherein determining the initial speed $v_0$ for the ADV to approach the one or more obstacles represented in the feature vector F', in autonomous driving mode, using the feature vectors F' and the speed model $W_{MODEL}$ comprises computing a dot product of a transpose of F' ($F'^T$) and $W_{MODEL}$.

17. The system of claim 13, wherein $W_{MODEL}$ is received from a remote server and $W_{MODEL}$ was trained from driving records generated while the ADV was navigated by a human driver, each driving record including a feature vector F that represents one or more obstacles to a human-driven ADV and an initial path speed $v_0$ used by the human driver to approach the one or more obstacles, the driving records obtained from each of a large plurality of human-driven ADV driving records, wherein F and $v_0$ can vary between driving records used to generate $W_{MODEL}$.

18. The system of claim 13, wherein the selecting determining operation further comprises:

determining the $W_{MODEL}$ from a plurality of speed models received from the remote server, the $W_{MODEL}$ associated with a feature vector $F_{MODEL}$ that most closely corresponds to F'.

* * * * *